(12) United States Patent
Haas et al.

(10) Patent No.: US 7,010,539 B1
(45) Date of Patent: Mar. 7, 2006

(54) SYSTEM AND METHOD FOR SCHEMA METHOD

(75) Inventors: Laura Myers Haas, San Jose, CA (US); Mauricio Antonio Hernandez-Sherrington, San Jose, CA (US); Renee J. Miller, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 09/658,303

(22) Filed: Sep. 8, 2000

(51) Int. Cl.
*G06F 17/30* (2006.01)

(52) U.S. Cl. ............ 707/101; 707/10; 707/104.1; 717/146

(58) Field of Classification Search ............ 707/1, 707/5, 3, 7, 10, 104.1, 200, 103, 104; 717/146; 714/143, 146
See application file for complete search history.

(56) References Cited

U.S. PATENT DOCUMENTS

| | | | | |
|---|---|---|---|---|
| 5,307,086 A | | 4/1994 | Griffin et al. ............... 345/146 |
| 5,680,629 A | | 10/1997 | Slayden et al. ............. 395/789 |
| 5,787,416 A | | 7/1998 | Tabb et al. ..................... 707/2 |
| 5,842,209 A | | 11/1998 | Mocek et al. .................. 707/4 |
| 5,899,988 A | * | 5/1999 | Depledge et al. .............. 707/3 |
| 5,970,490 A | * | 10/1999 | Morgenstern ................ 707/10 |
| 5,995,958 A | | 11/1999 | Xu ................................. 707/3 |
| 5,995,973 A | | 11/1999 | Daudenarde ................ 707/103 |
| 6,106,554 A | | 8/2000 | Bretton ....................... 623/6.62 |
| 6,253,218 B1 | | 6/2001 | Aoki et al. .................. 707/526 |
| 6,282,547 B1 | | 8/2001 | Hirsch ......................... 707/102 |
| 6,523,172 B1 | * | 2/2003 | Martinez-Guerra et al. . 717/143 |
| 2002/0023097 A1 | * | 2/2002 | Ripley ......................... 707/200 |
| 2002/0059566 A1 | * | 5/2002 | Delcambre et al. ......... 717/146 |

FOREIGN PATENT DOCUMENTS

| | | |
|---|---|---|
| JP | 08-095996 | 9/1994 |
| WO | WO 91/06059 | 10/1990 |

OTHER PUBLICATIONS

U.S. Appl. No. 60/214,891, filed on Jun. 29, 2000. Inventor: Ripley, John R., Assignee: INFOGLIDE CORPORATION.*
Patent Application: "User-Defined Relationships For Diagramming User-Defined Database Relations". Pgs.26. U.S. Appl. NO. 09/500,648, filed on Feb. 9, 2000.

* cited by examiner

*Primary Examiner*—Jeffrey Gaffin
*Assistant Examiner*—Hassan Mahmoudi
(74) *Attorney, Agent, or Firm*—John L. Rogitz

(57) ABSTRACT

A system and method for generating a source schema-to-target schema mapping includes grouping user-defined value correspondences into potential sets such that, for each potential set, at most one value correspondence per target attribute exists. The value correspondences represent functions and filters for deriving values of target attributes from values of source attributes. Candidate sets are selected from the potential sets and then grouped into ranked covers. Using the best cover, an SQL query representing a source schema-to-target schema mapping is generated.

22 Claims, 8 Drawing Sheets

ARCHITECTURE

ARCHITECTURE

OVERALL LOGIC, BATCH MODE

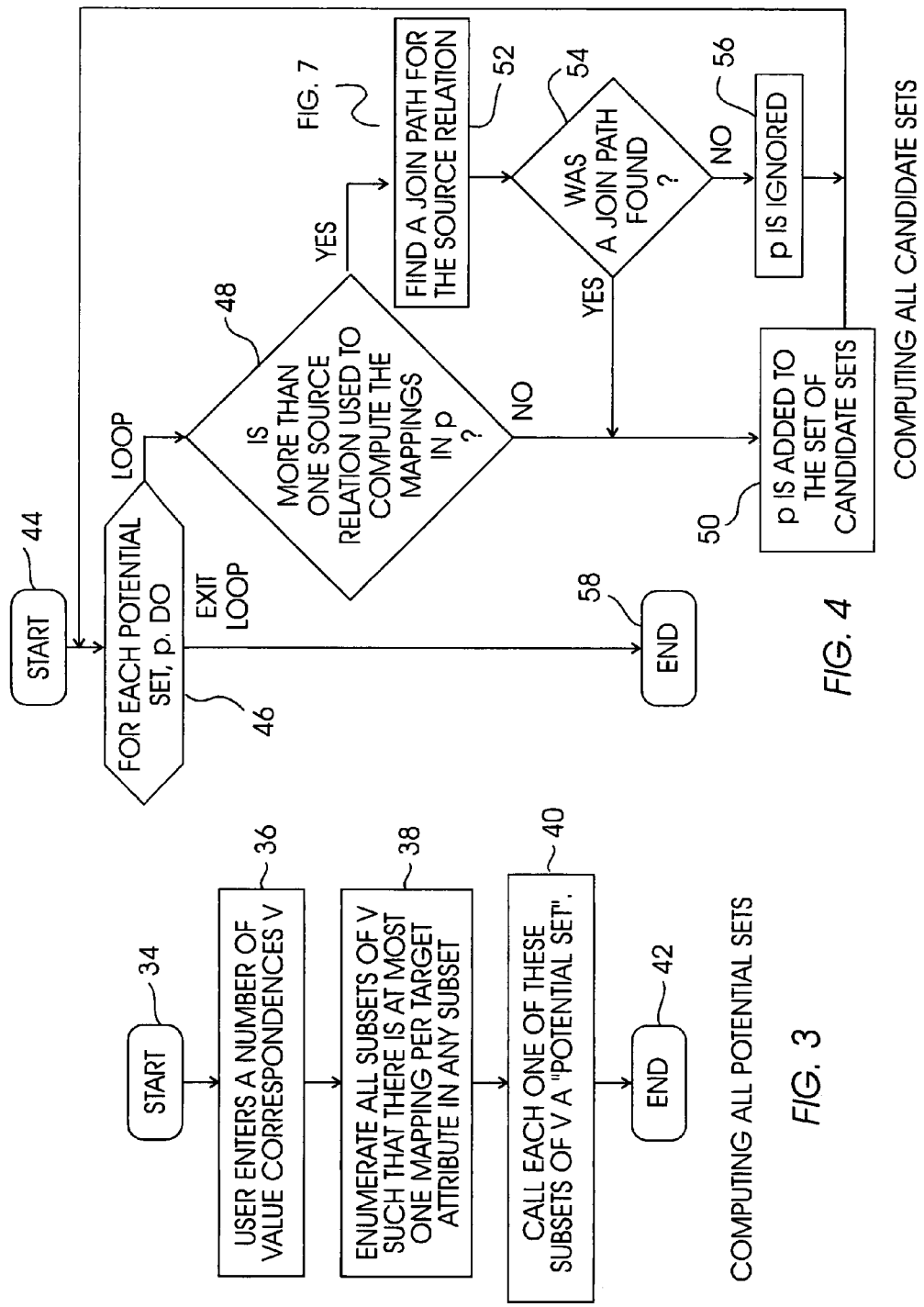

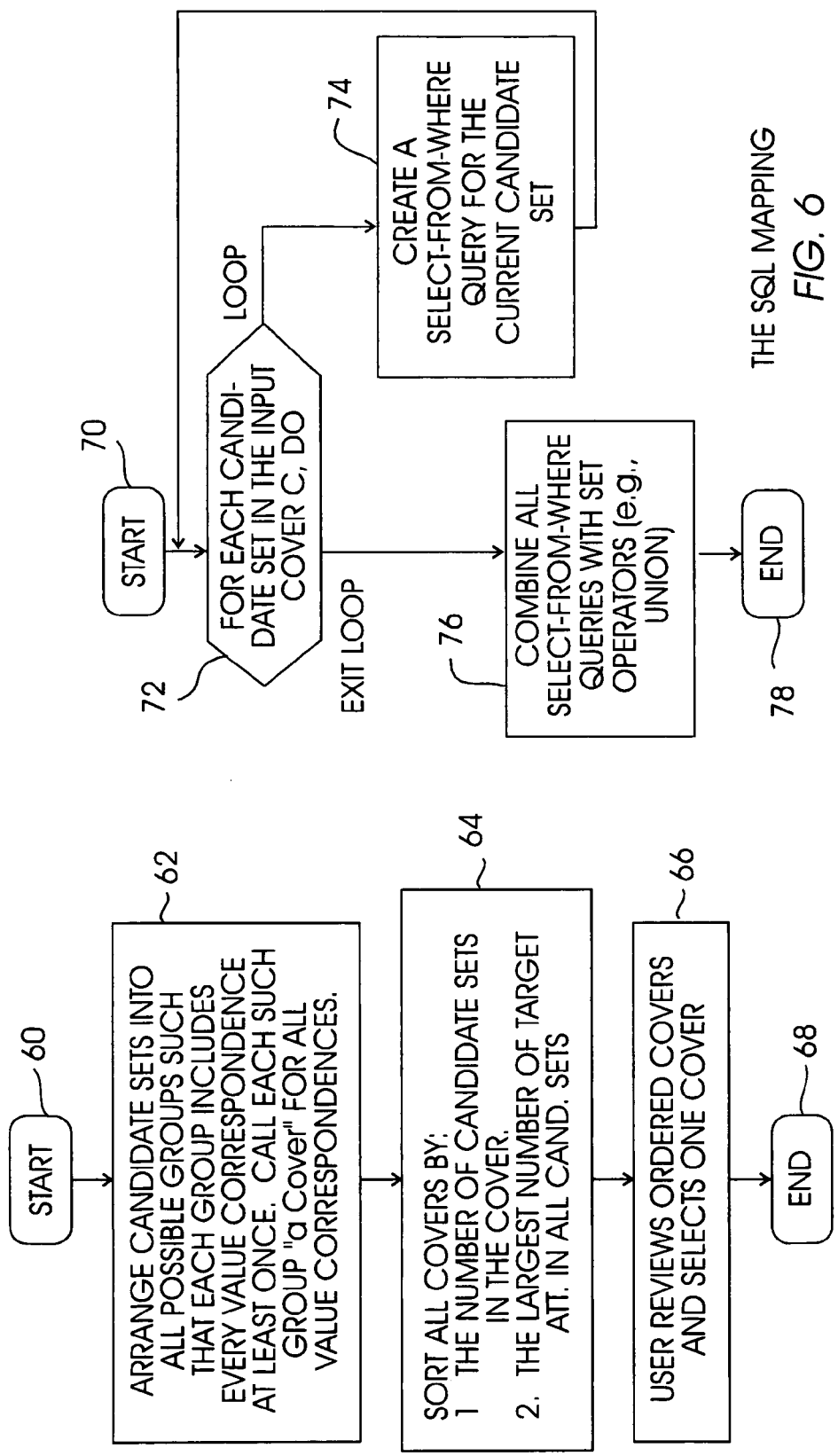
FIG. 6 THE SQL MAPPING
FIG. 5 FORMING ALL COVERS

SELECTING A JOIN PATH

INCREMENTAL ALGORITHM

COMPUTE THE NEW POTENTIAL SETS

COMPUTE THE NEW CANDIDATE SETS

SELECT A NEW COVER AND SQL MAPPING

DELETING A VALUE CORRESPONDENCE

DELETE ($v, c_i$)

SYSTEM AND METHOD FOR SCHEMA METHOD

BACKGROUND OF THE INVENTION

1. Field of the Invention

The present invention relates to systems and methods for mapping data in one or more data sources having source data schemas to at least one data target having a target data schema.

2. Description of the Related Art

Many modern applications such as data warehousing, global information systems, and electronic commerce require accessing a data source that stores data arranged in a source schema, and then using that data at a target which requires the data to be arranged in a target data schema. As but one example, product data that is stored in one schema for optimal storage efficiency might have to be accessed and reformatted into another schema for Web commerce, often in real time.

Thus, mappings between a source schema and a target schema are required. Creating such mappings currently is a largely manual and difficult process, which is accomplished using complex programs that are handwritten or pieced together by special tools and that must be carefully tuned to optimize performance. Particularly in the context of e-commerce, this is unacceptable, because e-commerce applications evolve very quickly and often require direct access to source data in real time. With this in mind, the present invention recognizes that it is desirable to facilitate creation of a source-to-target mapping by a user who might not be an expert in schema mapping.

The present invention critically observes that in the above-mentioned applications, particularly in e-commerce, it is not necessary to transform an entire source database into a target schema to satisfy a single request. Moreover, the present invention critically observes that in the above-mentioned applications, both data transformations and schema transformations might be required. In conventional integration paradigms, these are viewed as separate endeavors. One consequence is that conventional integration paradigms do not make use of data in evaluating schema correspondences. In the context of the above-mentioned applications, however, the present invention recognizes that data advantageously can be used to evaluate various schema mappings.

The present invention also recognizes that relational database management systems (RDBMS) are often used as data sources and as targets. With this recognition in mind, in light of the observations above regarding the need to quickly and with simplicity generate source-to-target mappings, the present invention understands that a DBMS can also be used to create mappings by using SQL queries, even when a user is not an expert in SQL. As set forth below, this is done by guiding the user over a space of potentially many competing join queries and then selecting only a subset of the join queries as the desired source-to-target mapping.

SUMMARY OF THE INVENTION

A general purpose computer is programmed according to the inventive steps herein to undertake the schema mapping of the present invention. The invention can also be embodied as an article of manufacture—a machine component—that is used by a digital processing apparatus such as a computer and which tangibly embodies a program of instructions that are executable by the digital processing apparatus to execute the present logic. This invention is realized in a critical machine component that causes a digital processing apparatus to perform the inventive method steps herein.

Accordingly, a general purpose computer includes logic for undertaking method acts to map data arranged in a source schema into a target schema. The method acts undertaken by the logic include receiving at least one value correspondence, with each value correspondence representing a function for deriving a value of a target attribute from one or more values of source attributes. If desired, a value correspondence can also represent a filter. The value correspondences are grouped into potential sets, and candidate sets are selected from the potential sets. These candidate sets are next grouped into covers. Using a "best" cover, an SQL query representing a source schema-to-target schema mapping is generated.

In a preferred embodiment, value correspondences are grouped into potential sets such that, for each potential set, at most one value correspondence per target attribute exists. A potential set is added to a set of candidate sets if only one source collection is used to compute mappings using the potential set, or, if more than one source collection is used, a join path for the source collections can be identified. In the below-described batch embodiment, candidate sets are arranged into groups such that each group includes every value correspondence at least once, with the groups establishing covers. A selected cover is established, preferably by ranking the covers by the number of candidate sets in each cover and number of value correspondences in each cover, and then presenting ranked covers to a user for selection of one of the covers as the selected cover. For each candidate set in the selected cover, a query is created, and the queries are combined to produce the SQL query that represents the mapping. Desirably, in a particularly preferred embodiment certain of the above-described logic is incrementally performed, whereby a user can add or delete a value correspondence from the selected cover and then view a new cover that has been updated accordingly.

In another aspect, a computer-implemented method for generating a mapping from a source schema to a target schema includes generating a mapping based on at least a subset of value correspondences. Each value correspondence represents a function for deriving a value of a target attribute from one or more values of source attributes. The method then includes allowing a user, in a user interaction, to incrementally add or delete a value correspondence from the subset. Based on the user interaction, a new mapping is generated, a representation thereof is presented to the user, and the user is then permitted to add or delete yet another value correspondence to generate yet another mapping.

In still another aspect, a computer program device includes a computer program storage device that can be read by a digital processing apparatus. A program is on the program storage device, and the program includes instructions that are executable by the digital processing apparatus for performing method acts for generating an SQL query representing a source schema-to-target schema mapping. The program includes computer readable code means for establishing plural value correspondences. Also, the program includes computer readable code means for generating subsets of value correspondences (referred to herein as "subsets") such that each subset has at most one value correspondence per target attribute, and further such that for each subset requiring more than one source collection to undertake a mapping, a join path can be found between the collections. Still further, subsets may be grouped into covers such that every value correspondence appears at least once in each cover. Computer readable code means generate an SQL query using one of the covers, with the query being representative of a source schema-to-target schema mapping.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a flow chart showing the logic for computing the potential sets of value correspondences;

FIG. 4 is a flow chart showing the logic for computing the candidate sets of value correspondences;

FIG. 5 is a flow chart showing the logic for computing covers from candidate sets;

FIG. 6 is a flow chart showing the logic for generating an SQL query using the cover;

DETAILED DESCRIPTION OF THE PREFERRED EMBODIMENTS

Figure 1:
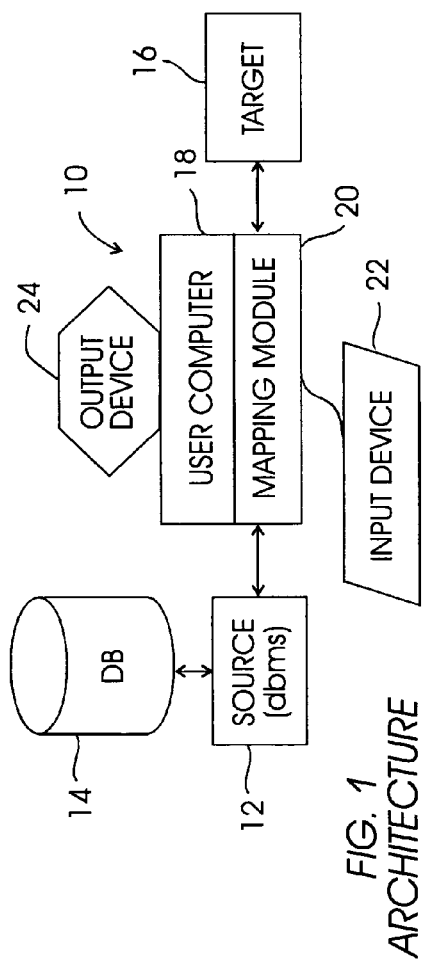
FIG. 1 is a schematic diagram showing the system of the present invention.

Referring initially to FIG. 1, a system is shown, generally designated 10, for mapping data formatted in a source schema to a target schema. In the embodiment shown in FIG. 1, a data source 12 such as a DBMS with associated database 14 stores data in a source schema, and a data target 16 stores data in a target schema, with the schemas being located in a single database or in respective databases. A user can use a computer 18 to execute a mapping module 20 to effect the inventive logic herein. The database 14 may reside, for example, in a Web server or other location remote from the user computer 18 and be accessible via a wide area network, such as but not limited to the Internet.

In one intended embodiment, the computer 18 may be a personal computer made by International Business Machines Corporation (IBM) of Armonk, N.Y., or the computer 18 may be any computer, including computers sold Linder trademarks such as AS400, with accompanying IBM Network Stations. Or, the computer 18 may be a Unix computer, or OS/2 server, or Windows NT server, or IBM RS/6000 250 workstation or an IBM laptop computer.

As shown in FIG. 1, the computer 18 is electrically connected to one or more input devices 22, e.g., a mouse or keyboard, which can be manipulated by a user of the system 10 to undertake the logic below. The results of the application execution can be output via an output device 24 such as a printer or monitor that are conventionally coupled to the computer 18.

With the above overview of the present architecture in mind, it is to be understood that the present logic is executed on the architecture shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the logic may be embodied by a computer program that is executed by a processor within the computer 18 as a series of computer-executable instructions. These instructions may reside, for example, in RAM of the computer 18 or on a hard drive or optical drive: of the computer 18, or the instructions may be stored on a DASD array, magnetic tape, electronic read-only memory, or other appropriate data storage device. In an illustrative embodiment of the invention, the computer-executable instructions may be lines of Java-byte codes.

Figure 2:
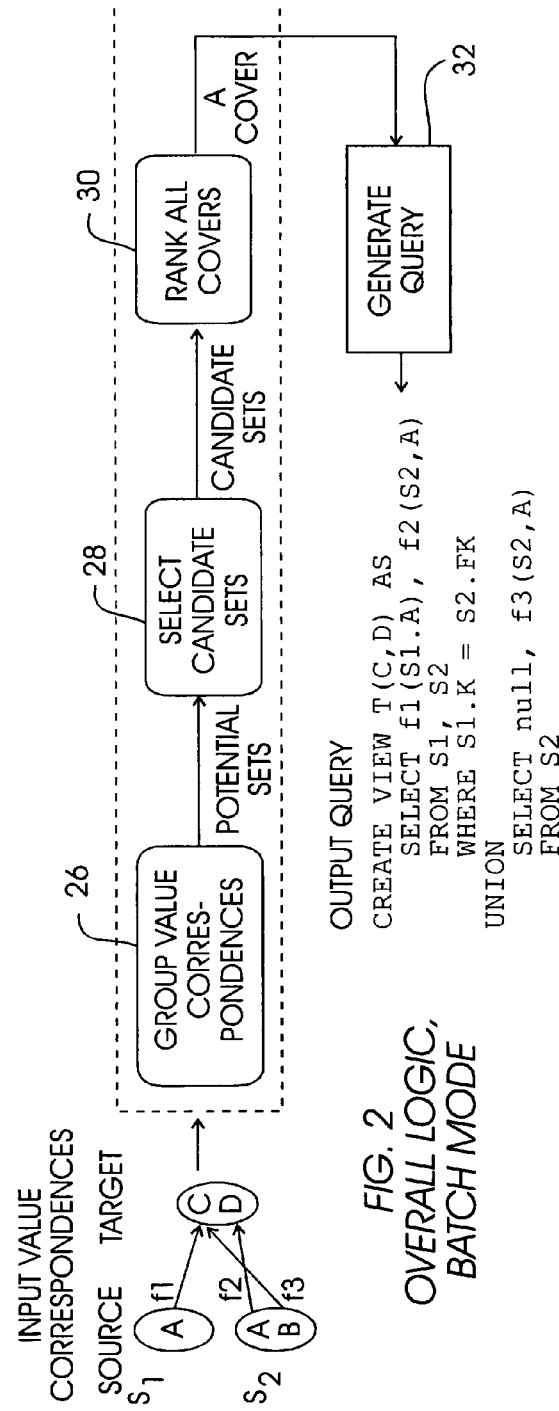
FIG. 2 is a flow chart showing the overall logic for the batch mode algorithm.

Now referring to FIG. 2, the overall logic of the present invention can be seen. For purposes of illustrating notation, the values for an attribute C in a target relation are defined by two correspondence functions: the function $f_1$ maps the values of an attribute A in a source relation $S_1$ into C in a target while another function $f_3$ maps the values of an attribute B in source relation $S_2$ into C. Further, the correspondence function $f_2$ maps the values of an attribute A in a source relation $S_2$ into the target attribute D. A value correspondence according to the preferred embodiment of the present invention includes a correspondence function "f" and a filter "p" (which defaults to TRUE, i.e., to pass all values from "f"). To illustrate, a correspondence function "f" might indicate that company codes are to be formed by concatenating ticker codes with the relation name, e.g., f:concat(relname(Ticker),Ticker)→CompanyCode, with a filter "p" defined to pass only certain values for "f", e.g., only Canadian companies. The logic below determines the necessary join paths to use when applying a filter.

The value correspondences discussed above can be defined by the user. Or, they can be suggested using linguistic techniques applied to data and metadata such as the names of schema components. Examples of such techniques can be found in Bright et al., "Automated Resolution of Semantic Heterogeneity in Multidatabases", *ACM Trans. on Database Sys.* (*TODS*), 19(2):212–253, June 1994 and in Johannesson, "Linguistic Support for Analyzing and Comparing Conceptual Schemas", *Data and Knowledge Engineering,* 21(2):165–182, 1997.

As indicated in FIG. 2, once the value correspondences have been received, the logic moves to block 26 to group the value correspondences into potential sets according to the logic below, and then at block 28 the potential sets are pruned into candidate sets. Next, at block 30, the candidate sets are grouped into "covers" and ranked in accordance with logic to be shortly set forth. Based on at least one of the covers (generally the highest-ranked cover), a query is generated and output at block 32, with the query representing a source schema-to-target schema mapping. An example of such a query is shown in FIG. 2 and reproduced for convenience as follows:

CREATE VIEW T(C,D) AS
SELECT f1 (S1, A), f2(S2, A)
FROM S1, S2
WHERE S1.K=S2.FK
UNION
SELECT NULL, f3(S2, A)
FROM S2

FIGS. 3–7 show the details of the overall logic discussed above. Commencing at start state 34 in FIG. 3, the logic flows to block 36 to receive the value correspondences, either from the user or from the above-mentioned linguistic techniques. Then, at block 38 all subsets of value correspondences are identified in which, for each subset, there is at most one mapping per target attribute, i.e., at most one value correspondence per target attribute. Thus, each value correspondence by itself establishes a subset, while combinations of value correspondences that satisfy the above constraint also establish respective subsets. Block 40 simply indicates that each subset output at block 38 establishes a potential set. The logic of FIG. 3 ends at state 42.

In one preferred embodiment, potential sets are generated on demand from the next phase of the logic (FIG. 4). Accordingly, the order in which potential sets are passed preferably follows the heuristic that preference is given to potential sets with the largest number of value correspondences and, then, those whose value correspondences use the smallest set of source relations. Also, if a particular candidate set is selected for use in the schema mapping as discussed further below, potential sets that are proper subsets of the candidate set can be pruned, since they are unlikely to appear in the mapping.

FIG. 4 shows how the potential sets are next processed. Commencing at start state 44, the logic enters a DO loop at state 46 for each potential set "p". Moving to decision diamond 48 in the DO loop, it is determined whether, for the potential set under test, more than a single source relation is required to compute the mappings in the potential set. If not, the potential set is added to a set of candidate sets at block 50. Otherwise, the logic flows to block 52, discussed further below in reference to FIG. 7, to find a join path for the source relations. If it is determined at decision diamond 54 that no join path could be found, the potential set is ignored or otherwise discarded at block 56, and the logic loops back to retrieve the next potential set for test at state 46. If, on the other hand, it is determined at decision diamond 54 that a join path was found, the logic adds the potential set to the set of candidate sets at block 50. At the conclusion of testing all potential sets, the logic of FIG. 4 ends at state 58.

Moving now to FIG. 5, the logic for constructing covers from candidate sets can be seen. Commencing at start state 60, the logic moves to block 62 wherein the candidate sets are grouped into all possible groups that satisfy the following condition. Each group must contain every value correspondence at least once. Each such group establishes a cover.

Proceeding to block 64, the covers are next sorted. In one preferred embodiment, the covers are first sorted by the number of candidate sets in the cover, from lowest to highest. For covers having the same number of candidate sets, the covers are further ordered by the number of target attributes used in all candidate sets, from highest to lowest.

The covers can then be presented in ranked order on. e.g., the output device 24 such that the user can then establish a selected cover at block 66 by, e.g., appropriately manipulating the input device 22. The logic of FIG. 5 ends at state 68.

FIG. 6 shows how the SQL mapping is undertaken. Commencing at start state 70, the logic proceeds to state 72, wherein for each candidate set in the selected cover a DO loop is entered. The DO loop proceeds to block 74 wherein a SELECT-FROM-WHERE query is created for the candidate set under test. Once all candidate sets have been proceed through the DO loop, the logic combines all the queries with set operators, such as the UNION operator, at block 76. The output of block 76 establishes the mapping. The logic then ends at state 78.

Figure 7:
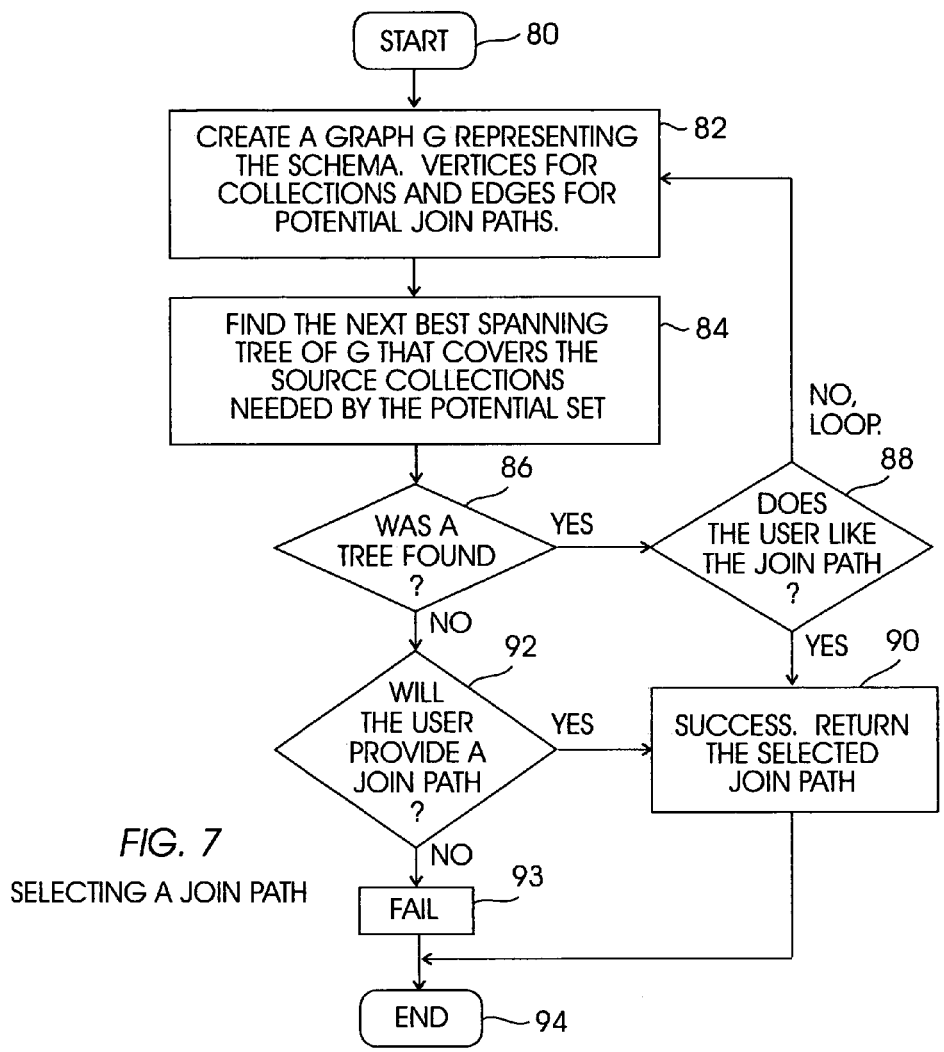
FIG. 7 is a flow chart showing the logic for finding a good join path.

FIG. 7 shows the details of block 52 in FIG. 4. Commencing at start state 80, the logic moves to block 82 to create a graph "G" that represents the source schema. The vertices of the graph G represent the source relations and the edges of the graph represent potential join paths. Then, at block 84 the best spanning tree is found that encompasses the source relations required for the potential set under test. When multiple join paths exist including join paths involving outer joins, join paths that produce the fewest dangling tuples are preferred. If it is determined at decision diamond 86 that a tree was indeed found, if desired, input from the user can be accepted at decision diamond 88 regarding whether the user finds the join path represented by the tree to be acceptable.

If not, the logic loops back to block 84; otherwise, the logic moves on to block 90 to return the spanning tree as the join path.

If desired, if no tree is found at decision diamond 86, the user can be given the choice of defining a join path at decision diamond 92. If the user elects to do so, the join path is accepted at block 90. If the user does not enter a join path at decision diamond 92, the logic returns "fail" at block 93. The logic ends at state 94.

In contrast, if, at decision diamond 86 it is determined that no spanning tree satisfying the above constraints can be found, the logic returns "FAIL" at state 94. The logic then ends at state 92.

Figure 8:
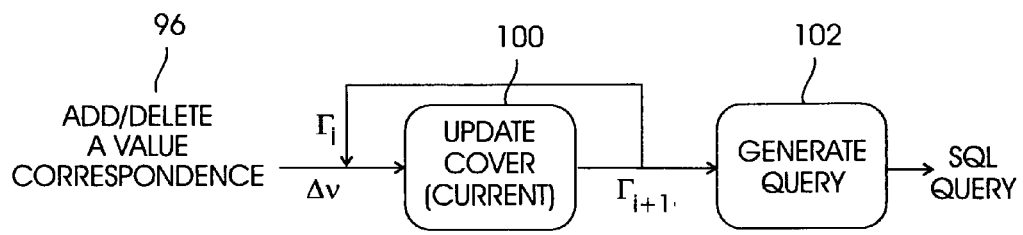
FIG. 8 is a flow chart showing the logic for the incremental embodiment.

In a particularly preferred embodiment, the above logic is undertaken incrementally, by allowing the user to add a value correspondence to and/or subtract a value correspondence from the current cover one at a time and then viewing the result of the modification. FIG. 8 shows the overall logic behind the incremental approach. A value correspondence is added or deleted at state 96. Then, at state 100 the current cover is updated in the case of an insertion as described below in reference to FIGS. 9–11 or, in the case of a deletion, in accordance with FIGS. 12 and 13. A query is generated at block 102, with an SQL query being output as the new mapping for review thereof by the user and for potentially more incremental changes to the mapping by adding/deleting value correspondences.

Figure 9:
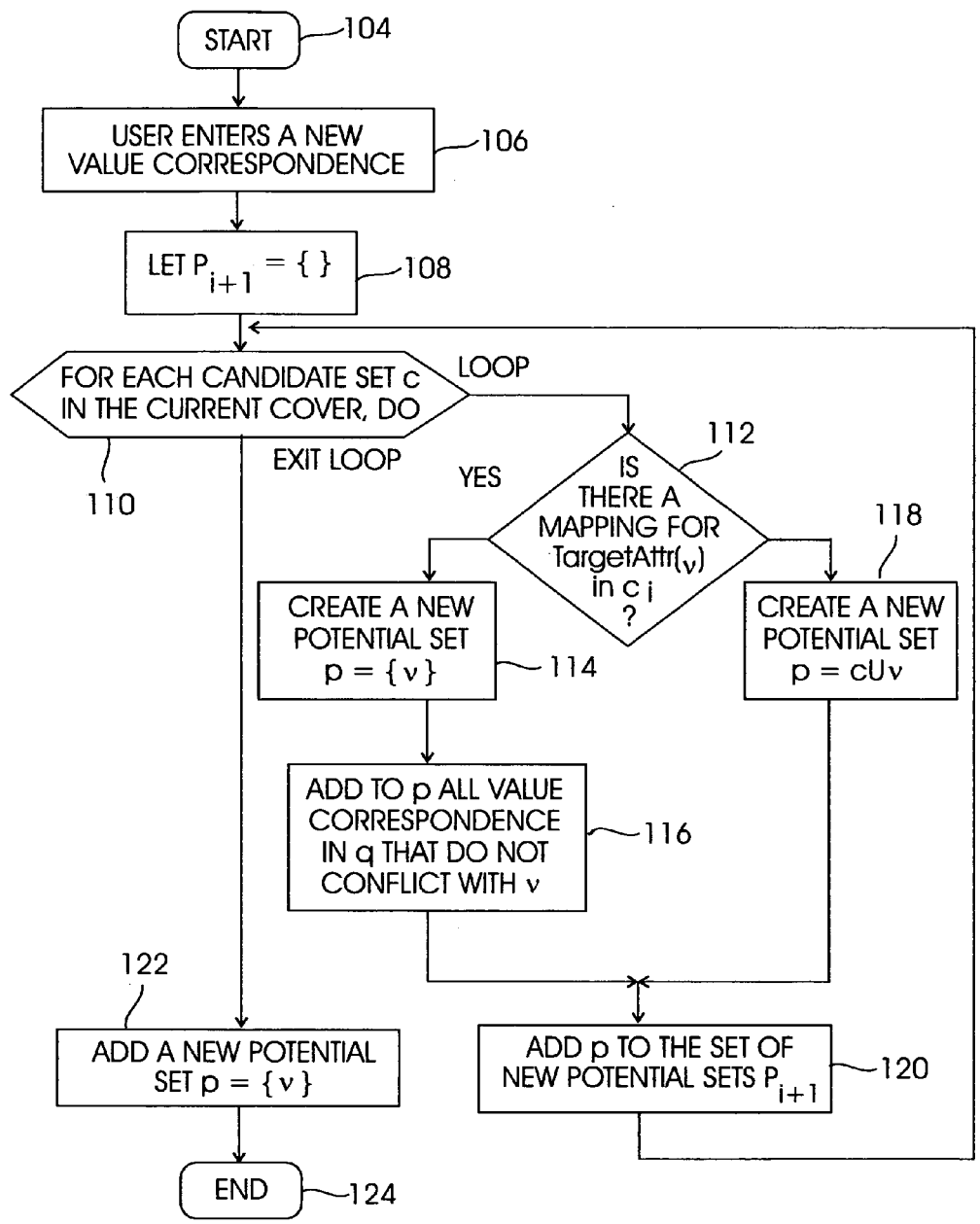
FIG. 9 is a flow chart showing the logic for computing new potential sets of value correspondences in the incremental logic in the case of an addition.

FIG. 9 shows how the candidate sets are updated for the case where a new value correspondence is added. Commencing at start state 104, the logic moves to block 106, where, as stated above, the user can add a new value correspondence. A new set $P_{i+1}$ is defined at block 108, and then at state 110 a DO loop is entered for each candidate set in the cover being incrementally modified. Moving to decision diamond 112, it is determined whether a target mapping exists for the new value correspondence in the candidate set under test, and if so a new potential set "p" is created that consists of the new value correspondence at block 114. To this new potential set is added, at block 116, all value correspondences in the candidate set under test that do not conflict with the newly added value correspondence. Two value correspondences do not conflict if they define different target attributes and the set of source relations used by one correspondence is a subset of the source relations used by the other correspondence. If, on the other hand, no mapping exists at decision diamond 112, a new potential set "p" is created at block 118 containing all value correspondences in the candidate set under test plus the newly added value correspondence.

From block 116 or block 118, the logic proceeds to block 120 to add the new potential set "p" to the set $P_{i+1}$ defined at block 108. At the end of the DO loop, the new potential sets in the set $P_{i+1}$ are passed on to the next portion of the algorithm. In the case wherein a value correspondence is removed, it is removed from all candidate sets, with those that become empty as a result being pruned.

Figure 10:
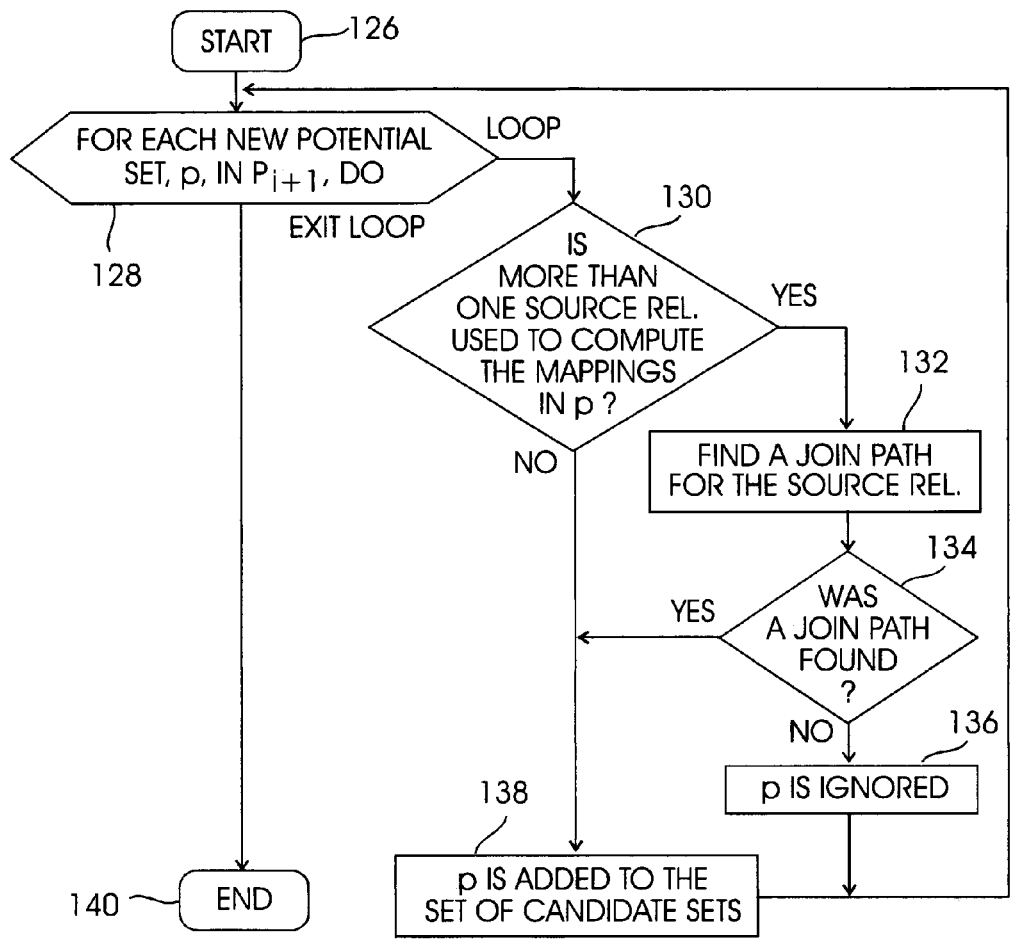
FIG. 10 is a flow chart showing the logic for incrementally computing the candidate sets of value correspondences in the case of an addition.

FIG. 10 shows how the incremental logic next functions. Commencing at start state 126, the logic enters a DO loop at state 128 for each potential set "p" in the set $P_{i+1}$. Moving to decision diamond 130 in the DO loop, it is determined whether, for the potential set under test, more than a single source relation is required to compute the mappings in the potential set. If not, the potential set is added to a set of candidate sets at block 138. Otherwise, the logic flows to block 132 to find a join path for the source relations. If it is determined at decision diamond 134 that no join path can be found, the potential set is ignored at block 136, and the logic loops back to retrieve the next potential set for test at state 126. If, on the other hand, it is determined at decision diamond 134 that a join path was found, the logic adds the potential set to the set of candidate sets at block 138. At the conclusion of testing all potential sets, the logic of FIG. 10 ends at state 140.

Figure 11:
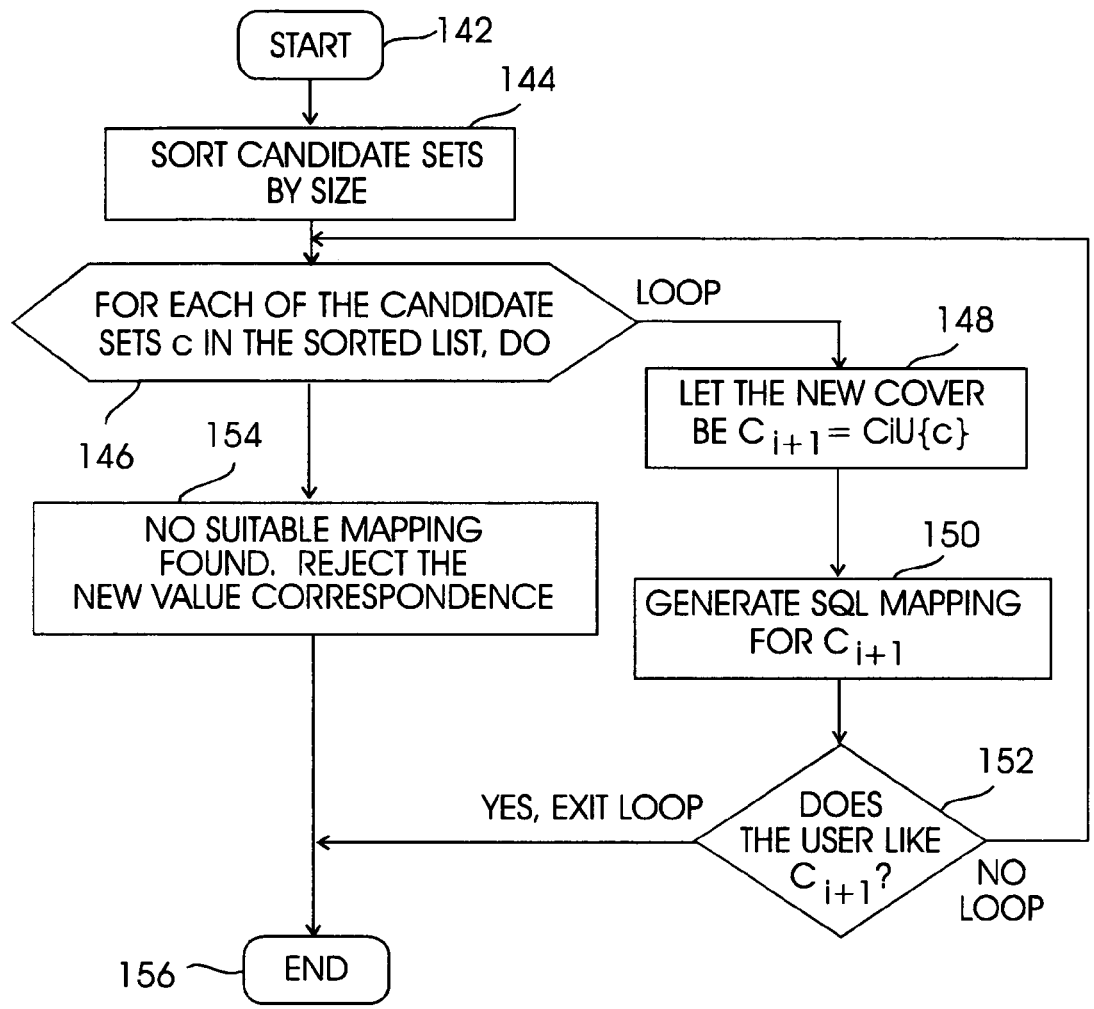
FIG. 11 is a flow chart showing the logic for incrementally computing covers in the case of an addition.

From FIG. 10, the logic moves to FIG. 11. Commencing at start state 142, the logic moves to block 144 to sort the candidate sets by size, from smallest to largest. A DO loop is entered at state 146 where, for each candidate set, the logic moves to block 148 to establish a new cover to be the union of the old (current) cover plus the candidate set under test. From block 148, the DO loop moves to block 150 to generate an SQL mapping for the new cover in accordance with principles set forth above. The mapping is presented to the user, who can determine whether it is acceptable at decision diamond 152. If it is acceptable, the logic ends at state 156 by outputting the new cover and associated mapping. Otherwise, the logic loops back to state 146 to test the next candidate set in the sorted list.

Figure 12:
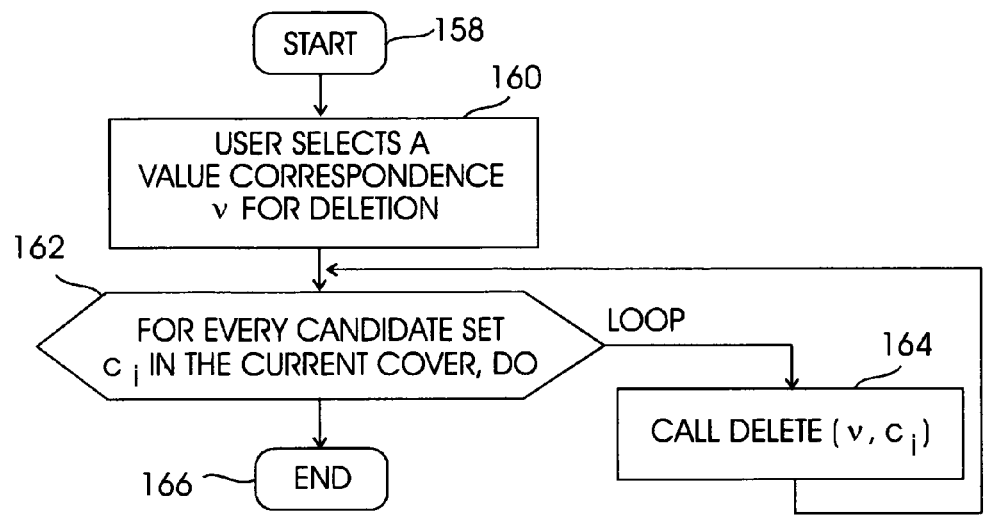
FIGS. 12 and 13 are flow charts showing the logic for incrementally updating covers in the case of a deletion.
Figure 13:
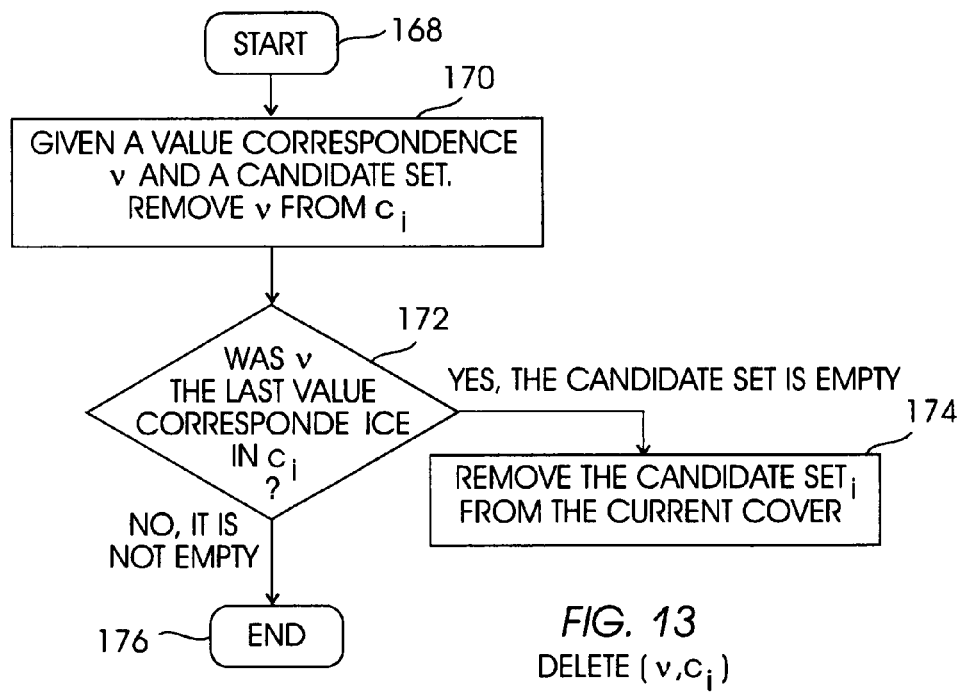

FIGS. 12 and 13 show how the current cover is incrementally updated at block 100 in FIG. 8 in the case of a deletion. Commencing at start state 158, the logic moves to block 160 wherein the user selects a value for the correspondence "v" being deleted. At state 162, a DO loop is entered for each candidate set in the current cover. At block 164, the algorithm shown in FIG. 13 is called. At the end of the DO loop, the logic exits at state 166.

FIG. 13 starts at state 168 and proceeds to block 170. At block 170, the value correspondence "v" is removed from the candidate set under test. Moving to decision diamond 172 it is determined whether "v" was the last value correspondence in the set under test. If it was, meaning that the set under test is now empty, the logic proceeds to block 174 to remove the set from the current cover, ending at state 176. If other value correspondences remain in the set under test, the logic moves from decision diamond 172 to the end state 176.

While the particular SYSTEM AND METHOD FOR SCHEMA MAPPING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A computer system, comprising:
a general purpose computer, the computer including logic for undertaking method acts to map data arranged in a source schema into a target schema, the method acts undertaken by the logic including:
receiving at least one value correspondence, each value correspondence representing a function for deriving a value of a target attribute from one or more values of source attributes;
grouping at least some value correspondences into potential sets;
selecting candidate sets from at least some potential sets;
grouping at least some candidate sets into covers; and
using at least one cover, generating at least one query representing a source schema-to-target schema mapping.

2. The computer of claim 1, wherein the method acts undertaken by the logic to execute the grouping act include:
grouping value correspondences into potential sets such that, for each potential set, at most one value correspondence per target attribute exists.

3. The computer of claim 2, wherein the method acts undertaken by the logic further include:
adding a potential set to a set of candidate sets if only one source relation is used to compute mappings using the potential set; otherwise
adding a potential set to the set of candidate sets only if a join path for the source relations can be identified.

4. The computer of claim 3, wherein the method acts undertaken by the logic further include:
arranging candidate sets into groups such that each group includes every value correspondence at least once, the groups establishing covers.

5. The computer of claim 4, wherein the method acts undertaken by the logic further include:
establishing at least one selected cover;
for each candidate set in the selected cover, creating at least one query; and
combining the queries for the cover.

6. The computer of claim 5, wherein the method acts undertaken by the logic to establish at least one selected cover include:
ranking the covers by at least one of: a number of candidate sets in each cover, and a number of target attributes; and
presenting ranked covers to a user for selection of one of the covers as the selected cover.

7. The computer of claim 3, wherein the logic undertakes the act of adding a potential set to the set of candidate sets only if a join path for the source relations can be identified using a spanning tree.

8. The computer of claim 1, wherein the logic incrementally undertakes the acts of grouping value correspondences into potential sets, selecting candidate sets, grouping candidate sets into covers, and generating queries representing mappings.

9. A computer-implemented method for generating a mapping from a source schema to a target schema, comprising:
generating a mapping based on at least a subset of value correspondences, each value correspondence representing a function for deriving a value of a target attribute from one or more values of source attributes;
allowing a user, in a user interaction, to incrementally add or delete a value correspondence from the subset;
based on the user interaction, generating a new mapping;
presenting a representation of the new mapping to the user such that the user can view the representation; and
permitting the user to add or delete a value correspondence embodied in the new mapping to generate another mapping.

10. The method of claim 9, wherein the generating act includes:
grouping at least some value correspondences into potential sets;
selecting candidate sets from at least some potential sets;
grouping at least some candidate sets into covers; and
using at least one cover, generating at least one query representing a source schema-to-target schema mapping.

11. The method of claim 10, further comprising:
grouping value correspondences into potential sets such that, for each potential set, at most one value correspondence per target attribute exists.

12. The method of claim 11, further comprising:
adding a potential set to a set of candidate sets if only one source relation is used to compute mappings using the potential set; otherwise
adding a potential set to the set of candidate sets only if a join path for the source relations can be identified.

13. The method of claim 12, further comprising:
arranging candidate sets into groups such that each group includes every value correspondence at least once, the groups establishing covers.

14. The method of claim 13, further comprising:
establishing at least one selected cover;
for each candidate set in the selected cover, creating at least one query; and
combining the queries for the cover.

15. The method of claim 14, further comprising:
ranking the covers by at least one of: a number of candidate sets in each cover, and a number of target attributes; and
presenting ranked covers to a user for selection of one of the covers as the selected cover.

16. The method of claim 12, further comprising adding a potential set to the set of candidate sets only, if a join path for the source relations can be identified using a spanning tree.

17. A computer program device comprising:
a computer program storage device readable by a digital processing apparatus; and
a program on the program storage device and including instructions executable by the digital processing apparatus for performing method acts for generating a query representing a source schema-to-target schema mapping, the program comprising:
computer readable code means for establishing plural value correspondences;
computer readable code means for generating subsets of value correspondences such that (1) each subset has at most one value correspondence per target attribute, (2) for each subset requiring more than one source relation to undertake a mapping, a join path can be found between the relations, and (3) each subset includes at least every value correspondence; and
computer readable code means for generating a query using one of the subsets, the query being representative of a source schema-to-target schema mapping.

18. The computer program product of claim 17, further comprising computer readable code means for sorting the subsets and displaying at least portions of a sorted list of subsets, such that a user can establish a selected subset used to generate the query.

19. The computer program product of claim 18, wherein the means for generating subsets generates candidate sets, each subset including one or more candidate sets, and the means for sorting sorts the subsets by inverse number of candidate sets.

20. The computer program product of claim 19, wherein the means for sorting, also sorts the subsets by the number of value correspondences in the subsets.

21. The computer program product of claim 19, wherein the means for generating a query creates at least one query for each candidate set in the selected subset, and then combines the queries for the subset.

22. The computer program product of claim 21, wherein the means for generating subsets and the means for generating a query are incrementally invoked by a user to selectively add or delete value correspondences from a selected subset.

* * * * *